(No Model.)
J. DRAPER.
HAND PROPELLED VEHICLE.
No. 402,812. Patented May 7, 1889.
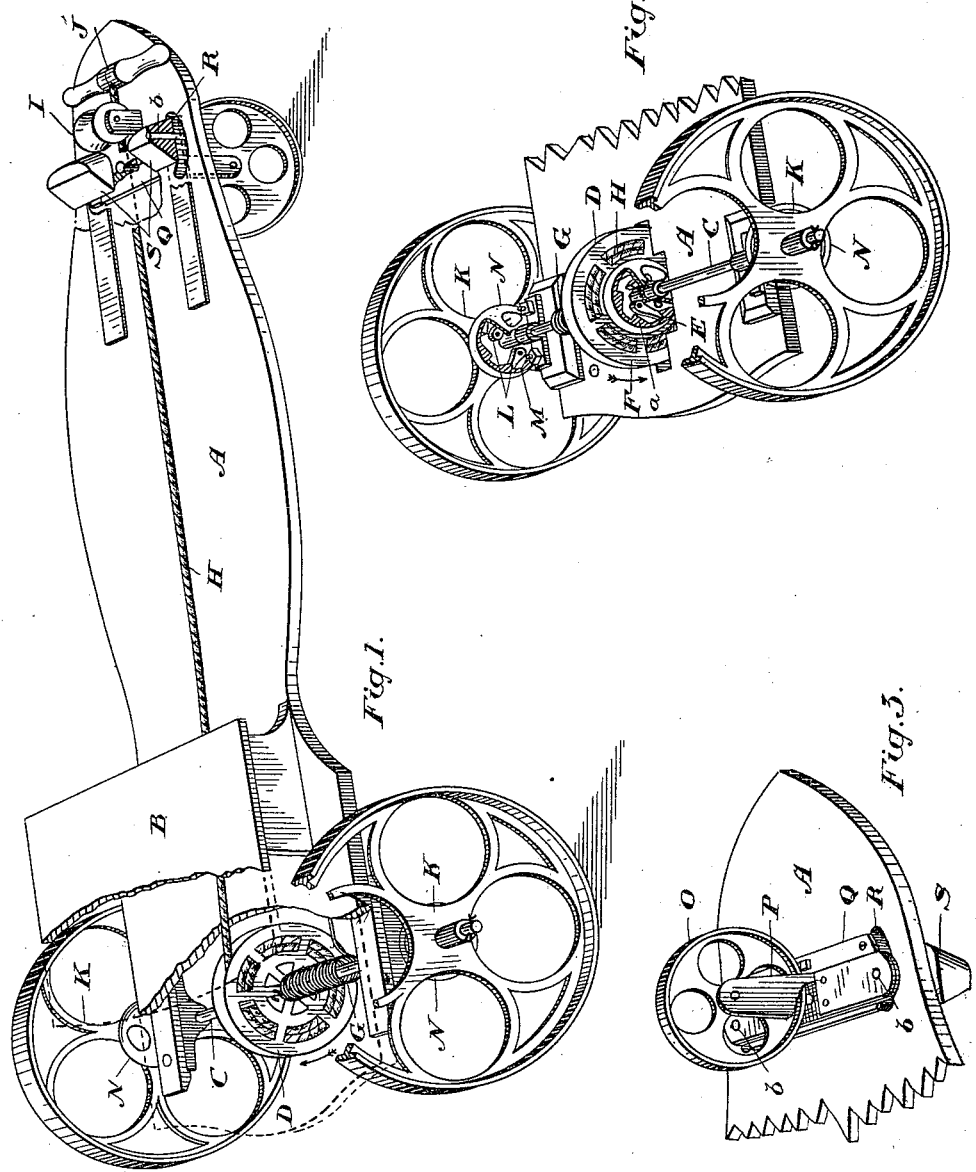
Witnesses.
J. Edw. Maybee
J. M. Jackson
Inventor.
John Draper
by
Donald C. Ridout &co
Attp

UNITED STATES PATENT OFFICE.

JOHN DRAPER, OF WHITBY, ONTARIO, CANADA.

HAND-PROPELLED VEHICLE.

SPECIFICATION forming part of Letters Patent No. 402,812, dated May 7, 1889.

Application filed February 27, 1888. Serial No. 265,392. (No model.)

*To all whom it may concern:*

Be it known that I, JOHN DRAPER, of the town of Whitby, in the county of Ontario, in the Province of Ontario, Canada, have invented a certain new and Improved Motor-Power for Road-Vehicles, of which the following is a specification.

The object of the invention is to design a motor-power for a road-vehicle which will enable the rider to propel himself with ease and rapidity; and it consists, essentially, of a cord wound upon a grooved pulley loosely journaled on the axle of the driving-wheels and provided with a pawl designed to engage with ratchet-teeth formed on a disk fixed to the axle, the whole being arranged in connection with a spring and other parts so that the winding and unwinding of the cord will produce the desired motion for the vehicle, substantially as hereinafter more particularly explained.

Figure 1 is a perspective view, partially in section, of a child's tricycle provided with my improved motor. Fig. 2 is a perspective bottom view of driving-axle fitted with my improved mechanism. Fig. 3 is a perspective bottom view of the front or steering wheel of my improved tricycle.

Although my invention is applicable to other vehicles than the tricycle shown, I have specially designed it for the purpose of providing a motor which will be popular with children for driving their tricycles or carts.

In the drawings, A represents the body of the tricycle or cart, and B the seat. The rear part of the body A is supported by the axle C, which revolves in suitable journals fixed to the said body.

D is a grooved pulley loosely journaled on the axle C and having ratchet-dogs E pivoted on its face, as shown in Fig. 2.

F is a disk fastened to the axle C and having a recess formed in it, in which ratchet-teeth $a$ are made.

G is a spiral spring wound loosely around the axle C, and connected at one end to the pulley D and at its other end to the body A. The cord H is connected to and wound around the grooved pulley D, its other end being carried around a pulley, I, and has a handle, J, fixed to it.

The power of the spring G is arranged so that it will cause the pulley D to revolve and wind the cord H around it. When the cord H is drawn upon, the pulley D will revolve in the direction indicated by arrow, and the dogs E will engage with the ratchet-teeth $a$ on the disk F. Consequently the axle C must revolve. When the cord H has been pulled to the fullest extent off the pulley D, the rider of the tricycle slackens the cord H, so as to permit the spring G to rewind it upon the pulley D. He then repeats the operation of pulling it off again, and thus each time that the cord is pulled off fresh power is applied to the axle; and, as the cord is very rapidly rewound, the power for propelling the axle is as continuous as the power applied to the propulsion of a boat by oars.

In order that the motion of the axle C may be imparted to the wheels K, I pivot ratchet-dogs L on the face of the wheels K, and arrange the said ratchet-dogs to engage with the ratchet-teeth M, formed on the disks N, attached to the axle C, the wheels K being loosely journaled on the axle C, and only connected to the said axle when it revolves by the action of the unwinding of the cord H. The front or guide wheel O is carried in the bracket P, pivoted on the bottom of the body A. The head of this bracket P is in contact with the rubbing-block Q, attached to the bottom of the body A, as indicated. Pins $b$ are fastened to the bracket P, and pass through slots R made in the body A, and are fixed to foot-blocks S, as indicated. The rider, seated on the seat B, places his feet upon the blocks S, and by pressure on either one or other of the said blocks is enabled to steer the tricycle.

What I claim as my invention is—

1. A body, A, having a seat, B, fixed to it on one end, and a bracket, P, carrying the guide-wheel O, pivoted on the bottom side of its other end, the foot-blocks S, fixed to the bracket P, in combination with the rubbing-block Q, attached to the bottom of the body, a cord, H, carried around the pulley I and wound around the pulley D, loosely journaled on the axle C, and connected to the said axle by a pawl and ratchet, and operated by a spring, G, connected at one end to the pulley D and at its other end to the body A, substantially as and for the purpose specified.

2. The combination, with the body and the rubbing-block Q, attached to the bottom thereof, of the bracket P, pivoted on the bottom of the body and carrying the guide-wheel and having its head in contact with the rubbing-block, the pins $b$, fastened to the bracket and passed through slots in said body, and the foot-blocks S, attached to said pins, substantially as shown and described.

Whitby, February 16, 1888.

JOHN DRAPER.

In presence of—
    JAMES DRAPER,
    SARAH DRAPER.